United States Patent
Koktan et al.

(10) Patent No.: US 8,086,910 B1
(45) Date of Patent: Dec. 27, 2011

(54) MONITORING SOFTWARE THREAD EXECUTION

(75) Inventors: Toby Koktan, Nepean (CA); Andre Poulin, Gatineau (CA)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/826,102

(22) Filed: Jun. 29, 2010

(51) Int. Cl.
*G06F 11/00* (2006.01)

(52) U.S. Cl. ......................................... 714/52

(58) Field of Classification Search ............ 714/52, 714/38
See application file for complete search history.

(56) References Cited

U.S. PATENT DOCUMENTS

| | | | |
|---|---|---|---|
| 6,418,542 B1 * | 7/2002 | Yeager | 714/38.11 |
| 6,457,142 B1 * | 9/2002 | Klemm et al. | 714/38.12 |
| 7,526,682 B1 * | 4/2009 | Chacko et al. | 714/38.11 |
| 7,530,072 B1 * | 5/2009 | Cheaz | 718/104 |
| 7,624,352 B2 * | 11/2009 | Colleran et al. | 715/764 |
| 7,739,689 B1 * | 6/2010 | Spertus et al. | 719/317 |
| 7,823,021 B2 * | 10/2010 | Abe | 714/38.1 |
| 2002/0162053 A1 * | 10/2002 | Os | 714/38 |
| 2003/0120896 A1 * | 6/2003 | Gosior et al. | 712/32 |
| 2006/0200702 A1 * | 9/2006 | Canning et al. | 714/38 |
| 2007/0220513 A1 * | 9/2007 | Hwang | 718/1 |
| 2008/0046782 A1 * | 2/2008 | Betancourt et al. | 714/38 |
| 2010/0077258 A1 * | 3/2010 | Lee et al. | 714/39 |

* cited by examiner

*Primary Examiner* — Bryce Bonzo
(74) *Attorney, Agent, or Firm* — Kramer & Amado, P.C.

(57) ABSTRACT

The invention is directed to monitoring execution of software threads, particularly by detecting a lockup or stall in execution of a software thread and initiating a remedial action in response. Advantageously, some embodiments of the invention automatically detect a lockup or stall in execution of a software thread by periodically sampling information corresponding to the thread, and, in accordance with a determination made using the information, initiate an attempt to recover from such a condition in execution without the need for manual intervention.

20 Claims, 2 Drawing Sheets

MONITORING SOFTWARE THREAD EXECUTION

FIELD OF THE INVENTION

The invention is directed to monitoring execution of software threads, particularly so doing in a network processor by detecting lockup or stalling of such execution.

BACKGROUND OF THE INVENTION

Network processors (NPs) are employed in many of today's communications products, as opposed to traditional application specific integrated circuits (ASICs) or field programmable gate array (FPGA) fixed hardware, primarily due to fact that the architecture of these processors provides the flexibility of a software based feature set solution with the high performance of ASICs. Network processors utilize parallel processing or serial pipelines and are programmable like general purpose microprocessors, but are optimized for packet processing operations required by data packet network communication devices.

Network processors execute what is commonly referred to as microcode to perform data path packet processing functions. A network processor typically has a set of software threads (also referred to as tasks) which are spawned to perform packet processing operations by executing specific pieces of microcode.

Memory content corruption, for example a soft-error causing a memory bit to invert or "flip", in a memory device used by the network processor may cause execution of one or more threads to lockup if the error corrupts a microcode instruction or a data structure used by the network processor. Additionally, a software bug or component defect in the network processor could interfere with normal processing, which could lead to thread execution lockups.

The result of thread execution lockup is that the locked up thread will no longer continue to process data path traffic, which can lead to a communication service outage or silent failure of the network communications device.

Soft-errors (single bit flips) can be mitigated effectively with hardware based error correction coding (ECC) protection. However in many cases it is not practical or even feasible to have 100% ECC coverage across all memories of a given network processor. Furthermore, ECC does not protect against multi-bit corruption or microcode software defects that can also lead to memory corruption and subsequent network processor thread execution lockup.

Hardware based ECC is not always feasible for various reasons, such as one or a combination of the following: added expense, insufficient space on the network processor to accommodate the extra hardware logic required for ECC codes, and performance degradation associated with the ECC hardware.

Good hardware design and component quality can reduce but can not completely eliminate the possibility of memory corruption due to soft-errors. Similarly, good software development practices can reduce but can not completely eliminate the possibility of software bugs that escape development testing.

Therefore, a way of mitigating the undesirable effects of network processor thread execution lockups that does not require ECC hardware is desired.

SUMMARY

Embodiments of the invention are directed to monitoring execution of software threads, particularly by detecting a lockup or stall in execution of a software thread and initiating a remedial action in response.

Some embodiments of the invention automatically detect a lockup or stall in execution of a software thread by periodically sampling information corresponding to the thread, and, in accordance with a determination made using the information, initiate an attempt to recover from such a condition in execution without the need for manual intervention.

Some embodiments of the invention provide a method executed on a microprocessor to automatically detect a lockup or stall in execution of a software thread of a network processor, and initiate a remedial action to mitigate undesirable effects caused by the lockup or stall such as a prolonged communication service outage in data traffic carried by a communication system employing the network processor. Other embodiments provide the method written in microcode and executed on the network processor, while other embodiments execute some steps of the method on the microprocessor and the remainder of the steps on the network processor.

Advantageously, some embodiments of the invention can be deployed in communications systems already in service by a software upgrade in the field, thereby avoiding the expense of hardware replacements in cases where ECC hardware was required.

According to an aspect of the invention a method of monitoring software thread execution is provided. The method comprises the steps of: detecting that execution of a software thread has timed-out; recording information corresponding to the software thread at a plurality of intervals over a duration of time; determining if some information so recorded remained unchanged for all of the plurality of intervals; and taking an action in accordance with the determination.

Advantageously, the step of recording may include recording microcode program counter information, software thread busy indication and originator information of the software thread. The originator is typically the entity that initiated the software thread, e.g. a port or serial interface on the network processor. There may be a sequence number associated with the originator to prevent false positive thread stall detection in situations where the originator is often the same. Furthermore, the method may additionally comprise: reporting a condition of the software thread responsive to an unchanging busy indication, the microcode program counter information having changed and the originator information having remained the same for all of the plurality of intervals.

Advantageously, the step of taking an action includes determining if the steps of recording and determining have already been performed twice with respect to the time-out interrupt; and resetting, responsive to said steps having already been performed twice, the network processor executing the software thread.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

The foregoing has referred to the detection of a lockup or stall in execution of a software thread. Herein, a lockup is defined as follows: lockup is when a timer for thread execution has expired, such that a time-out interrupt or similar indication has been asserted or expiration of an allotted thread execution time has been otherwise detected, e.g. via polling elapsed execution time of the thread, an execution status of the thread indicates that execution is ongoing i.e. in a busy state, and a program counter of the thread's microcode is not changing. A stall in execution is defined as when, like a lockup, an allotted time for thread execution has expired and the execution status of the thread is in a busy state; however unlike a lockup, the thread's microcode program counter is changing and the originator of the thread remains the same. When these conditions indicating a stall in execution of a thread are met, there is a possibility that the thread is executing in an endless loop; however there is also a possibility that the thread is executing properly. Therefore, when a stall is detected according to the foregoing conditions an action is initiated that is in accordance with the existence of these two possibilities, as will be described later.

Embodiments of the invention are directed to reliably detecting software threads whose execution has locked up (i.e. stopped processing microcode) or stalled (i.e. not terminating but still appearing to be executing microcode) while monitoring execution of software threads in a manner that is not intrusive to time critical processing functions carried out by the software threads. Indeed, to address the latter, more intense monitoring of a given software thread starts when an initial indication of a potential, or an existing, lockup or stall condition in execution is detected with respect to the thread via a time-out indication corresponding thereto, such as a thread time-out interrupt.

In order to reduce the possibility of a false positive lockup declaration, staged escalation of monitoring states and examination of numerous pieces of information related to a software thread having a time-out indication are utilized before making a determination with regard to the condition of the thread's execution. Additionally, to mitigate the risk of a false positive lockup declaration, a debounce (i.e. double-check) monitoring pass may be performed. Additionally, memory bus utilization of the network processor executing the thread may be determined before proceeding to a lockup determination. Although embodiments of the invention find advantageous use in network processors, they can also be used in more general processing devices.

Figure 1:
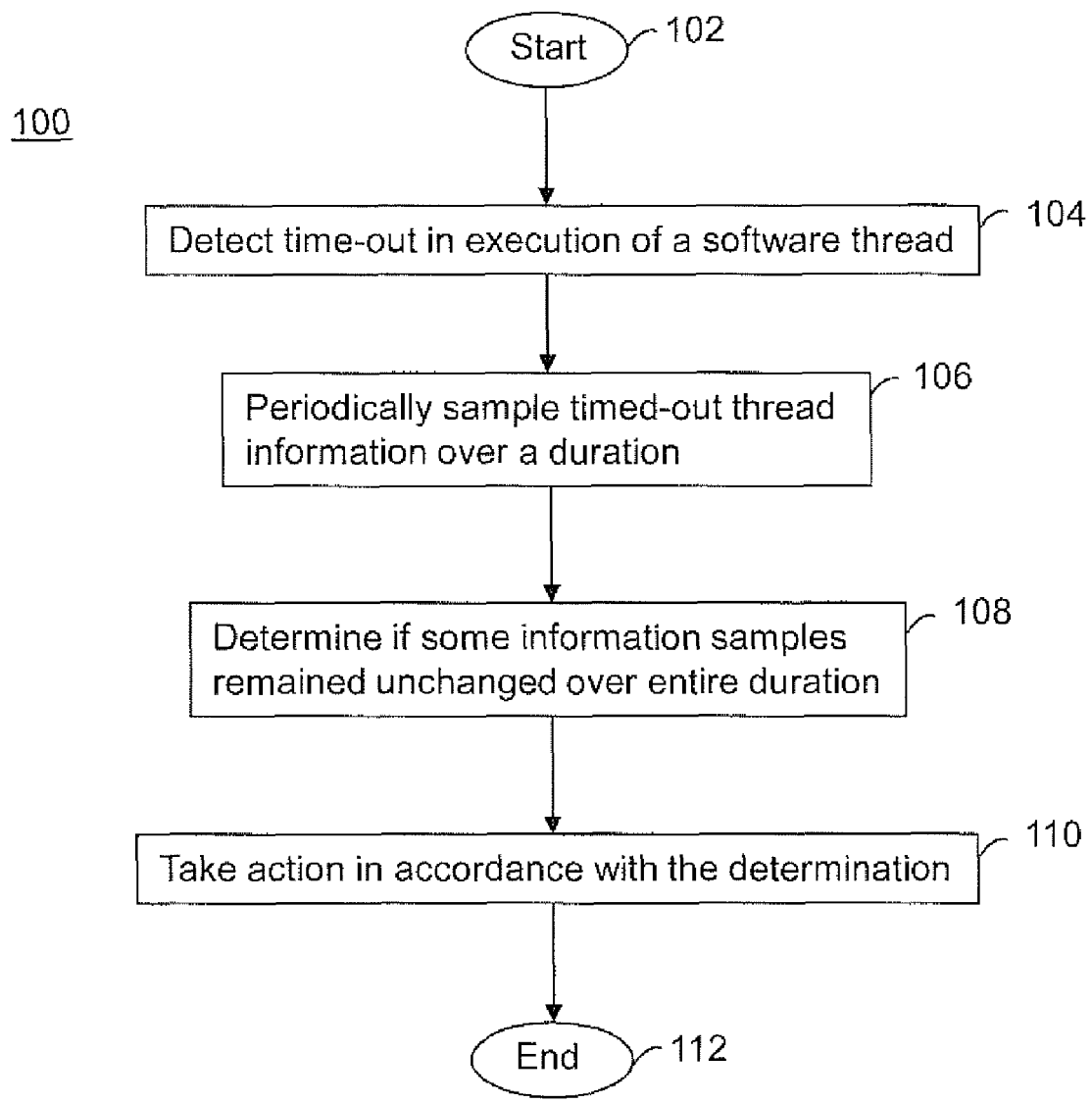
FIG. 1 is a flow chart illustrating a method of monitoring execution of software threads according to an embodiment of the invention.

FIG. 1 is a flow chart of a method 100 of monitoring execution of software threads according to an embodiment of the invention. The method 100 is executed on a general purpose microprocessor with access to the network processor. After starting 102, the method 100 proceeds to detecting 104 that execution of a software thread has exceeded a predetermined execution time interval. Such detection could be facilitated by receiving a time-out interrupt with respect to the software thread. As mentioned previously, other ways of determining that the software thread has exceeded its allotted execution time may be used instead of a time-out interrupt. After the thread time-out interrupt is received, information corresponding to the timed-out thread, so indicated by the interrupt, is periodically sampled 106 over a duration of time. Several information samples are taken in a periodic manner, although other embodiments may sample the information in a non-periodic manner. The duration is long enough to allow several information samples to be taken, for example in this embodiment the information is sampled every five milliseconds for a duration of four seconds. A determination 108 is made whether or not some of the information samples remained unchanged over the entire duration. In other words, the information samples are compared to each other to determine if any are different from the others. There are many ways to do this, however this embodiment simply compares the first information sample to each of the other information samples to detect if any are different from it. An action is then taken 110 in accordance with the determination 108, such as to initiate a remedial response if execution of the software thread is determined to be locked up or stalled.

Figure 2:
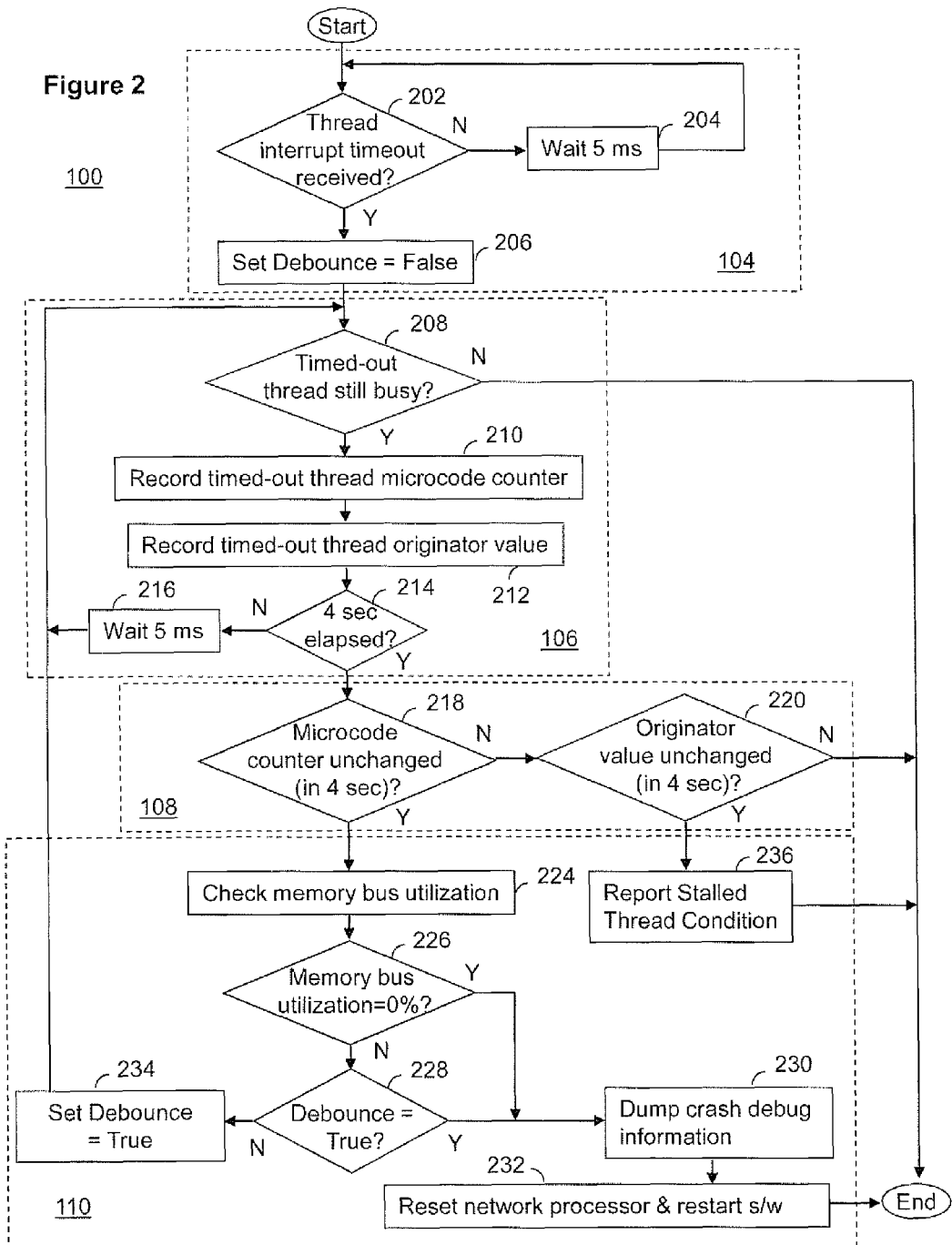
FIG. 2 is a flow chart illustrating the steps in the method of FIG. 1 in greater detail.

FIG. 2 is a flow chart that shows the steps of the method 100 in greater detail. The step of detecting 104 includes a polling function that periodically polls the status of interrupts. The detecting step 104 comprises determining 202 if a thread time-out interrupt has been received, and in the negative case, i.e. a thread time-out interrupt has not been received, the detecting step 104 waits 204 for a predetermined interval of time, in this case five milliseconds, and returns to the step of determining 202 if a thread time-out interrupt has been received. This detecting step 104 monitors multiple software threads being executed on the network processor for an occurrence of a time-out interrupt with respect to any one of these threads. In the affirmative case, i.e. a thread time-out interrupt has been received or otherwise detected; a debounce flag is set 206 to false, the detecting step 104 exits and execution of the method 100 proceeds to the step of sampling 106 information corresponding to the timed-out software thread so indicated by the time-out interrupt.

The step 106 of sampling information corresponding to the timed-out software thread includes determining 208 if execution status of the timed-out software thread is busy. If it is not busy the method 100 is terminated, and would typically startup again so as to continually monitor for software threads that have locked up or stalled in their execution. Otherwise, if execution status of the timed-out software thread is busy, the sampling step 106 proceeds to record 210 the value of the microcode counter of the timed-out software thread. An indication of the originator of the timed-out software thread is also recorded 212. These two recording steps 210, 212 can be carried out in either order or could be done as one step. A timer is then checked to determine 214 if the duration, in this case four seconds, has elapsed. If the duration has not elapsed the sampling step 106 waits for the predetermined interval of time, in this case five milliseconds, and then returns to the step of determining 208 if execution status of the timed-out software thread is still busy.

The step 108 of determining if some of the information samples remained unchanged over the entire duration includes determining 218 if all recorded values of the microcode program counter are the same over the duration, i.e. if the microcode program counter of the timed-out software thread remained unchanged over the entire duration. If the microcode program counter did not change over the duration the step 108 of determining proceeds to the step 110 of taking an action, otherwise a determination 220 is made whether or not the originator of the timed-out software thread was the same for the entire duration. If the originator of the timed-out software thread changed at any time over the duration the method 100 is terminated, and as before, it may restart so as to continually monitor for locked-up or stalled software threads. If the originator of the timed-out software thread did not change for the duration, the step 108 of determining proceeds to the step 110 of taking an action, which in this case includes reporting 236 the condition, e.g. to an operator or another software program.

The steps 218, 220, 208 of determining if either or all three of the thread busy indication, microcode program counter and originator remained the same for the duration over which the samples thereof where taken could be performed in either order as long as the actions taken on the logical combination of the results of the determinations 218, 220, 208 are the same as the foregoing description. That is, if either the thread busy indication, the microcode program counter or the originator of the timed-out software thread changed at some point in the duration, then the step 108 of determining should exit and the method 100 should terminate. That is because this logical combination indicates that execution of the timed-out software thread is neither locked up nor stalled. If the busy indication of the thread cleared at some point in the duration then the software thread cannot be locked-up or stalled and the microcode program counter and originator information is ignored. If the microcode program counter changed at some point in the duration but the originator of the timed-out software thread remained the same, execution of the timed-out software thread may have stalled, e.g. as executing in an endless loop, but could also be operating normally. The action taken under this logical combination is to report 236 the condition (e.g. potential stalled thread) to allow for further action such as analysis to be taken. However, if the microcode program counter and busy indication remained the same for the duration irrespective of changes or the lack thereof in the originator over the duration, then the step 108 of determining should exit and proceed to the step 110 of taking an action. That is because if the microcode program counter has not changed over the duration, execution of the timed-out software thread could be locked up, and remedial action may be necessary.

The step 110 of taking an action includes, in the case that the microcode program counter was the same over the duration, checking 224 the memory bus utilization of the network processor executing the timed-out software thread. A determination 226 is made whether or not that utilization is at zero, or alternatively below some threshold accommodating for any small inaccuracy in determining the utilization but still indicates that there has been no memory bus utilization by the network processor of the timed-out software thread over the duration. If the network processor executing the timed-out software thread has not utilized the memory bus over the duration, crash debug information pertaining to the timed-out software thread is dumped 230, or otherwise recorded, the network processor executing the timed-out software thread is reset 232 and its software is restarted. The method 100 terminates, and as before may restart automatically. If the memory bus utilization of the network processor executing the timed-out software thread is greater than zero, or greater than or equal to the threshold such that some bus utilization over the duration is indicated, a determination 228 is made whether or not the debounce flag is true. In the affirmative case, i.e. the debounce flag is true indicating that the steps of sampling 106 and determining 108 have already been performed twice on this time-out interrupt for this timed-out software thread, then the steps of dumping 230 crash debug information and resetting 232 the network processor executing the timed-out software thread and restarting all of the network processor's software are performed. Otherwise in the negative case, i.e. the debounce flag is false, the debounce flag is set 234 to true, the step 110 of taking action ends and the method 100 proceeds to the step 106 of sampling information corresponding to the timed-out software thread.

It should be noted that checking 224 the memory bus utilization and determining 226 if the memory bus utilization is at zero or below a threshold, are not necessary steps and may be omitted in some embodiments. These embodiments would be useful in cases where an indication of memory bus utilization is not available on a network processor. In embodiments where these steps of checking 224 and determining 226 are omitted, an affirmative determination 218 that the microcode counter has remained unchanged is followed by the step of determining 228 if the debounce flag is true. The remainder of the method in these embodiments is the same as previously described.

Advantageously, this software mechanism will effectively eliminate very undesirable customer service outages or "silent failures" that may occur due to network processor lockups from multiple possible causes with minimal network downtime. ECC is typically not implemented across all memories in use by the Network processor and therefore memory corruption and a subsequent partial (one or a few software threads) or complete (all threads) lockup is always a possibility. This software solution can be applied to existing products which are already deployed in customer networks (no new h/w needed). The solution provides an effective mitigation against worst-case network equipment failure scenarios and helps reduce potential product returns (and damage to customer perceived quality) following a network outage or silent failure. Overall, embodiments of the invention improve the robustness of telecom products by increasing the reliability of network processor based architectures.

Further advantageously, embodiments of the invention have broad applicability in telecom and other high-reliability applications that are likely to use network processors whether or not ECC protection is a viable option. Such embodiments can improve on existing solutions. This software upgradeable solution increases the reliability of communications systems in existing and future customer deployments without costly hardware swapping and/or re-designs.

Numerous modifications, variations and adaptations may be made to the embodiments of the invention described above without departing from the scope of the invention, which is defined in the claims.

What is claimed is:

1. A method of monitoring software thread execution, comprising the steps of:
   detecting that execution of a software thread has timed-out;
   recording information corresponding to the software thread indicative of an execution problem at a plurality of intervals over a duration of time;
   determining if some information so recorded remained unchanged for all of the plurality of intervals;
   performing a debounce monitoring pass to prevent a false positive lockup declaration; and
   taking an action in accordance with the determination.

2. The method of claim 1, wherein the step of recording comprises:
   determining at each interval if execution of the software thread is in a busy state; and
   terminating the method responsive to the execution of the software thread not being in the busy state.

3. The method of claim 2, wherein the step of recording further comprises:
   recording microcode program counter information and originator information of the software thread, and
   the action taken is responsive to the microcode program counter information having changed and the originator information having remained unchanged for all of the plurality of intervals.

4. The method of claim 3, wherein the action taken comprises:
   reporting a condition of the software thread.

5. The method of claim 1, wherein the step of determining comprises:
   terminating the method responsive to none of the information so recorded having remained unchanged for all of the plurality of intervals.

6. The method of claim 1, further comprising:
sampling the information corresponding to the software thread in a non-periodic manner.

7. The method of claim 1, further comprising:
sampling the information corresponding to the software thread for a duration long enough to allow several information samples to be taken.

8. The method of claim 1, further comprising:
periodically polling a status of interrupts.

9. The method of claim 1, further comprising:
setting a debounce flag to false after detection of a software thread time-out interrupt.

10. The method of claim 1, further comprising:
setting a debounce flag to true after the recording step and the determining step have been performed twice.

11. The method of claim 10, further comprising:
after setting the debounce flag to true, resetting the network processor executing the timed-out software thread.

12. A method of monitoring software thread execution, comprising the steps of:
detecting that execution of a software thread has timed-out;
recording information corresponding to the software thread indicative of an execution problem at a plurality of intervals over a duration of time;
determining if some information so recorded remained unchanged for all of the plurality of intervals;
performing a debounce monitoring pass to prevent a false positive lockup declaration; and
taking an action in accordance with the determination, wherein taking an action comprises:
checking if memory bus utilization of a network processor executing the software thread is below a threshold; and
resetting, responsive to said memory bus utilization being below the threshold, the network processor.

13. The method of claim 12, wherein the step of recording further comprises:
recording microcode program counter information of the software thread; and
the step of checking is responsive to the microcode program counter information having remained unchanged.

14. The method of claim 13, wherein the step of resetting comprises:
dumping crash debug information of the software thread.

15. The method of claim 12, wherein the step of determining comprises:
ascertaining, responsive to said memory bus utilization not being below the threshold, if the steps of recording and determining have been performed more than once with respect to the software thread; and
resetting, responsive to said steps having been performed more than once, the network processor.

16. The method of claim 15, further comprising:
repeating the steps of recording and determining if said steps have not been performed more than once with respect to the software thread.

17. The method of claim 12, wherein the step of detecting comprises:
receiving a time-out interrupt with respect to the software thread.

18. The method of claim 12, comprising:
executing the method on a microprocessor to automatically detect either a lockup or a stall in execution of the software thread being executed by the network processor.

19. A method of monitoring software thread execution, comprising:
detecting that execution of a software thread has timed-out;
recording information corresponding to the software thread indicative of an execution problem at a plurality of intervals over a duration of time;
determining if some information so recorded remained unchanged for all of the plurality of intervals; and
checking if memory bus utilization of a network processor executing the software thread is below a threshold.

20. A method of monitoring software thread execution, comprising:
detecting that execution of a software thread has timed-out;
recording information corresponding to the software thread indicative of an execution problem at a plurality of intervals over a duration of time;
determining if some information so recorded remained unchanged for all of the plurality of intervals; and
resetting a network processor that was executing the timed-out software thread.

* * * * *